March 29, 1949. F. TURRETTINI 2,465,497
APPARATUS FOR MEASURING ANGLES
Filed Dec. 18, 1947
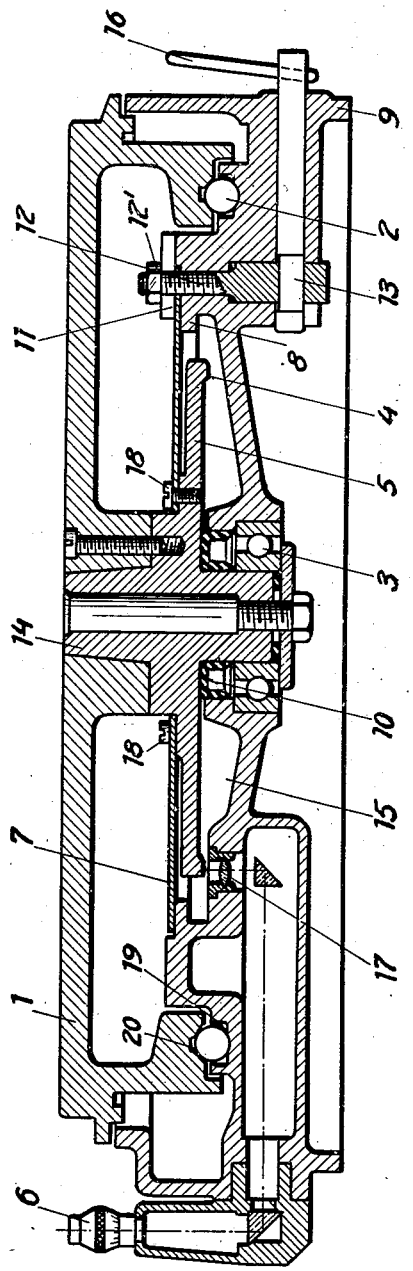
Inventor
Fernand Turrettini
By Robert E. Burns
Attorney Patented Mar. 29, 1949

2,465,497

UNITED STATES PATENT OFFICE 2,465,497

APPARATUS FOR MEASURING ANGLES

Fernand Turrettini, Bellevue-Geneva, Switzerland, assignor to Societe Genevoise d'Instruments de Physique, Geneva, Switzerland, a Swiss firm Application December 18, 1947, Serial No. 792,434
In Switzerland October 5, 1942

Section 1, Public Law 690, August 8, 1946
Patent expires October 5, 1962

1 Claim. (Cl. 33—1)

The present invention relates to apparatuses for the measurement of angles and more particularly to the dividing tables adapted for use as appliances for machine tools.

In the known constructions, the dividing table is generally driven by a worm meshing with a worm gear cut from the solid table, and the worm is intended simultaneously as a motion transmitting member and as a measuring member. To this end the worm is provided with a graduated drum intended for measuring angular values. The inconvenience of such a construction resides in that the worm is subjected to severe strains as a driving member and loses its precision. To obviate this inconvenience, dividing tables have been constructed in which the measurement of the angular values is no longer effected by the driving worm but on a graduated disc or ring observed through an optical device. The measurements are more precise, but there is still the drawback that the graduated disc or ring may readily become soiled by particles of lubricant or dust which dim the image of the graduation.

The general object of the present invention is the provision of an apparatus for measuring angles which obviates this drawback and efficiently prevents the precision graduation from being soiled by lubricant or dust.

Among the more particular objects of the invention are: the provision in an apparatus for measuring angles of a table rotatably mounted on a frame and having a hub formed with a circular flange carrying the graduation; the provision of a clamping device carried by the frame for temporarily locking the table in any desired angular position; the provision of a thin annular member secured to the hub of the table and adapted to be pressed against an annular part of the frame by the clamping device to lock the table in the requested position, said thin annular member being also intended to protect the graduation against the entrance of lubricant and dust.

In the annexed drawing I have shown an illustrative embodiment of the invention in the form of a dividing apparatus for machine tool.

The single figure of the drawing is an axial sectional view of the apparatus.

Referring now to the drawing in detail, 1 is a dividing table revolvably supported by means of a ball bearing 3 on a frame 9. The hub 14 of the table is provided with a circular flange 5 on the underside of which the precision graduation is engraved as at 4. This graduation can be observed through the ocular 6 of a microscope, the objective of which is shown at 17.

To lock the table in any desired position after it has been revolved through the requested angle, a handle 16 is operated to rotate an eccentric 13 which actuates a bolt 12, the nut 12' of which presses through the medium of a clamping plate 11 the outer rim of a thin annular iron plate 7 against an annular shoulder 8 of the frame 9. This iron plate 7 has its inner rim secured by means of screws 18 to the upper face of the flange 5.

As the annular iron plate 7 is thin and flexible, it does not exert any noticeable friction on the shoulder 8 of the frame on which its outer rim permanently rests. Plate 7 seals from above the recess 15 in which the graduation 4 is enclosed, thus fully protecting this graduation against any soiling whatever. A packing gasket 10 is interposed between the frame 9 and the hub 14 in order to secure the sealing of the recess 15 from below.

In order to reduce the friction of the table 1 on the frame 9 in the event it should be heavily loaded, a train of balls 2 running in adjacent circular grooves 19 and 20 provided in the frame 9 and in the table 1 respectively, bears the axial strains.

What I claim is:

In an apparatus for measuring angles, in combination with a frame, a table revolvably mounted on said frame, said table having a hub formed with an annular flange below the underside of the table, graduations on the underside of said flange, an optical device associated with said frame for observing said graduations, said frame being formed with an annular shoulder surrounding said flange of the table, a thin annular member secured by its inner rim to the upper side of said flange and permanently resting on said shoulder of the frame to prevent entrance of dirt from above into the space enclosing said graduations, and manually operable clamping means associated with said frame for pressing the outer rim of said thin annular member against said shoulder of the frame thereby to lock said table in any desirable angular position.

FERNAND TURRETTINI.

REFERENCES CITED

The following references are of record in the file of this patent:

UNITED STATES PATENTS

| Number | Name | Date |
| --- | --- | --- |
| 173,638 | Hughes | Feb. 15, 1876 |
| 675,189 | Berger | May 28, 1901 |
| 750,766 | Hubbard | Jan. 26, 1904 |
| 1,798,139 | Boland | Mar. 31, 1931 |
| 2,184,352 | Langsner | Dec. 26, 1939 |